United States Patent Office 3,563,089
Patented Feb. 16, 1971

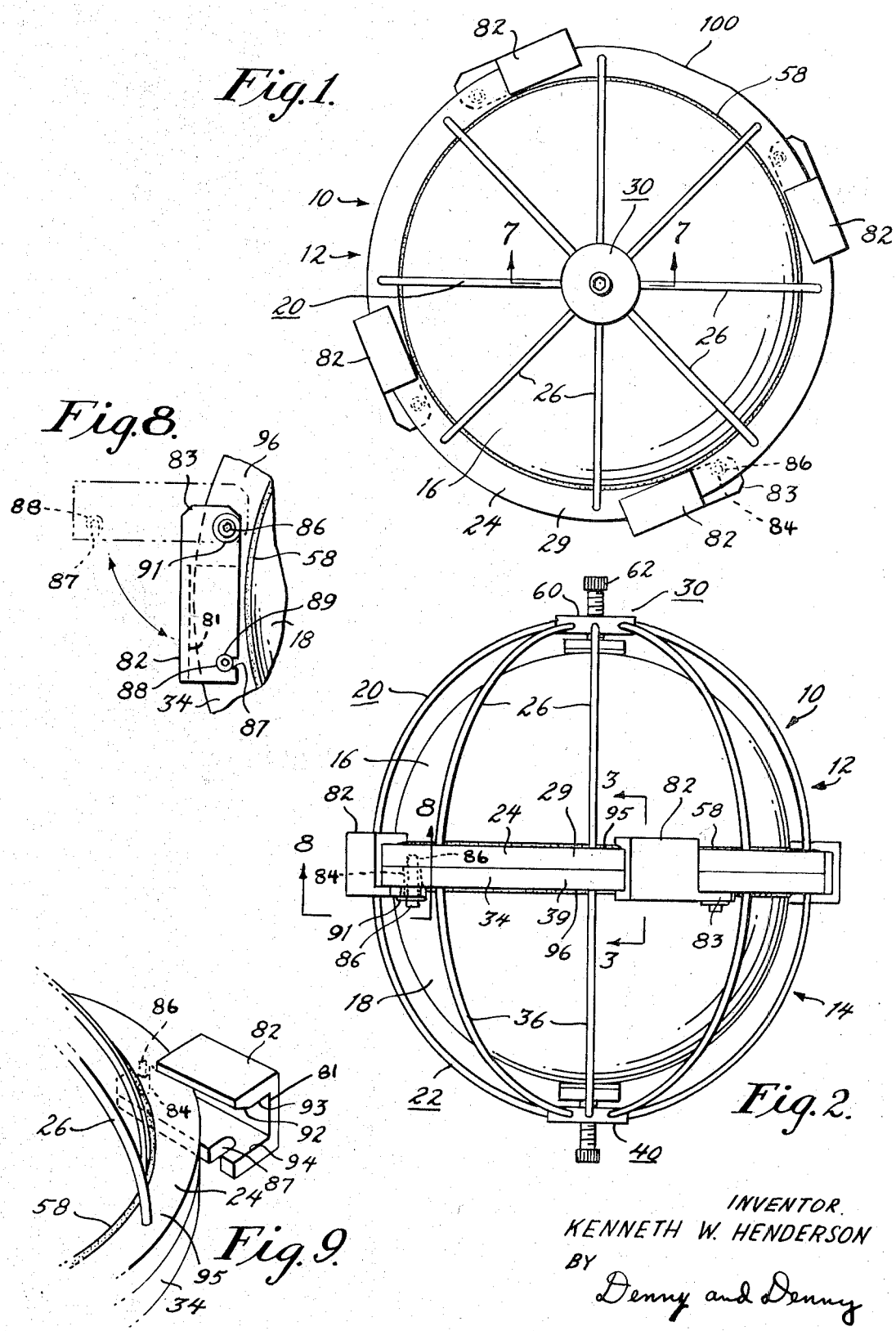

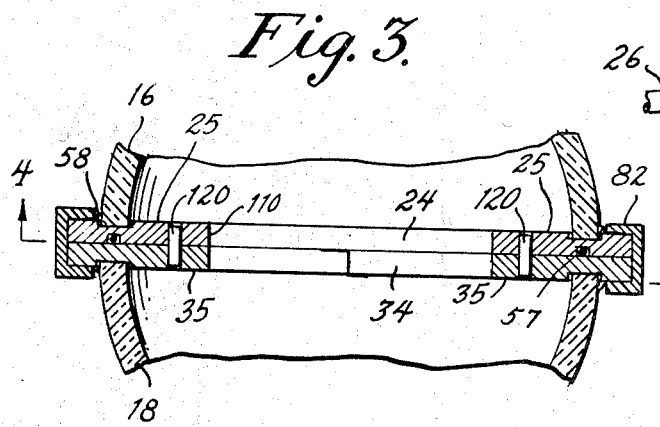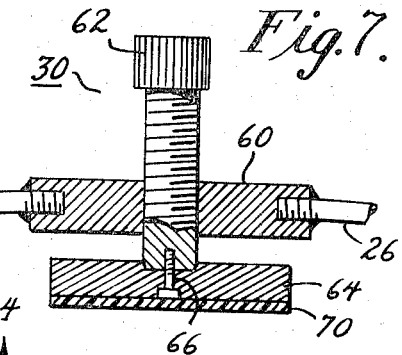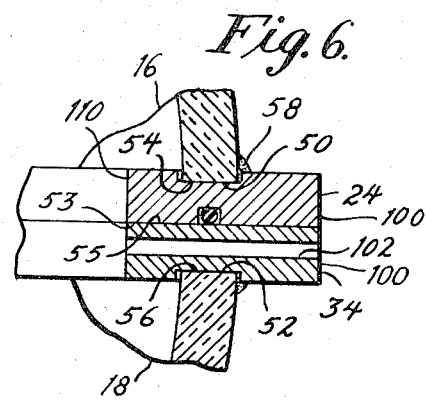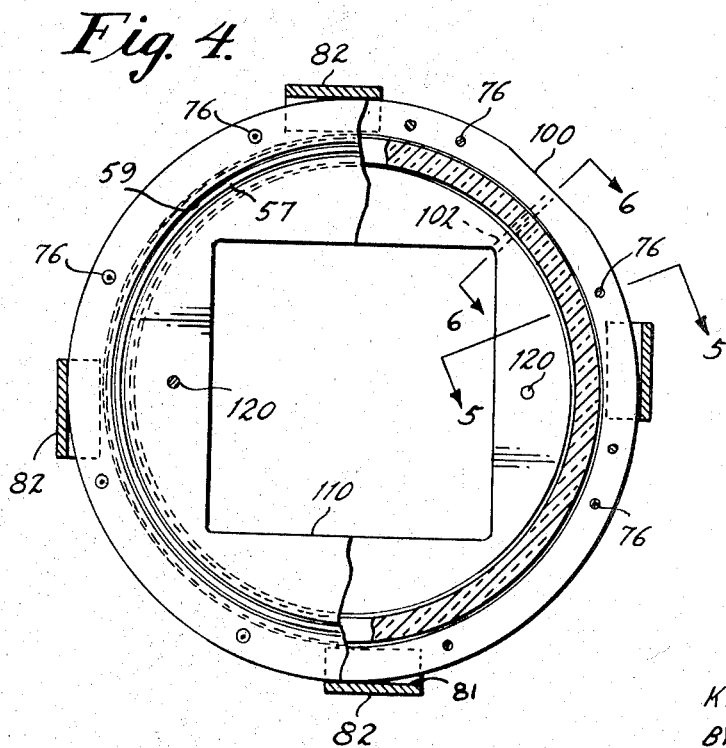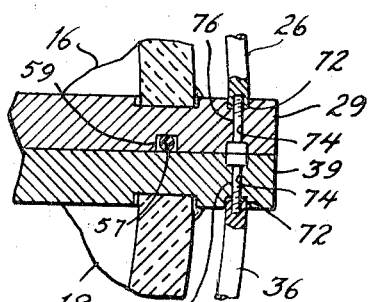

3,563,089
OCEANOGRAPHIC INSTRUMENT HOUSING
Kenneth W. Henderson, East Falmouth, Mass., assignor to Aquadyne, Inc., East Falmouth, Mass., a corporation of Delaware
Filed Dec. 20, 1967, Ser. No. 692,188
Int. Cl. G12b 9/00
U.S. Cl. 73—170                                    10 Claims

ABSTRACT OF THE DISCLOSURE

A housing for oceanographic use including two glass hemisphere assemblies and a mating protective cage, the cages having access holes through which electrical conductors and pressure tubes, or the like, may be placed, and the cages being secured to each other by clamps so as to provide convenient access to the interior of the housing.

BACKGROUND OF THE INVENTION

Devices comprising glass spheres enclosing instruments have been successfully used heretofore in oceanographic research and study. In one type of use, the device is ballasted to float at a predetermined depth. As it drifts with the ocean current, the device is tracked by a ship which receives signals transmitted by the device.

Attached to the outside of the device may be other instruments which are connected to the instruments inside the glass sphere by electrical conductors which, heretofore, have passed through holes in the glass sphere. Also, in another device, pressure sensing tubes, have been placed heretofore, through holes in the glass sphere and are connected to suitable mechanisms carried by the device, so that the device will drop ballast at a predetermined depth, or certain instruments may be activated at a predetermined depth.

BRIEF SUMMARY OF THE INVENTION

While glass spheres are particularly suited for underwater use at great depths, because of the high compressive strength of glass, there is always present the danger of damage to the glass, particularly the edge or terminal surfaces of the hemispheres forming the sphere, during handling of the device and during its use. It is, therefore, an object of this invention to minimize the possibility of damage to the glass sphere during handling or use.

Also, since some arrangement must be provided for access to the interior of the glass sphere, the glass sphere must necessarily be made in sections which are assembled together to form the sphere and it is a further object of this invention to provide an arrangement for quickly and conveniently being able to assemble and dissemble the sections of the sphere.

The foregoing and other objects of this invention, the principles of this invention, and the best modes in which I have contemplated applying such principles will more fully appear from the following description and accompanying drawings in illustration thereof.

BRIEF DESCRIPTION OF THE VIEWS

Figure 10:
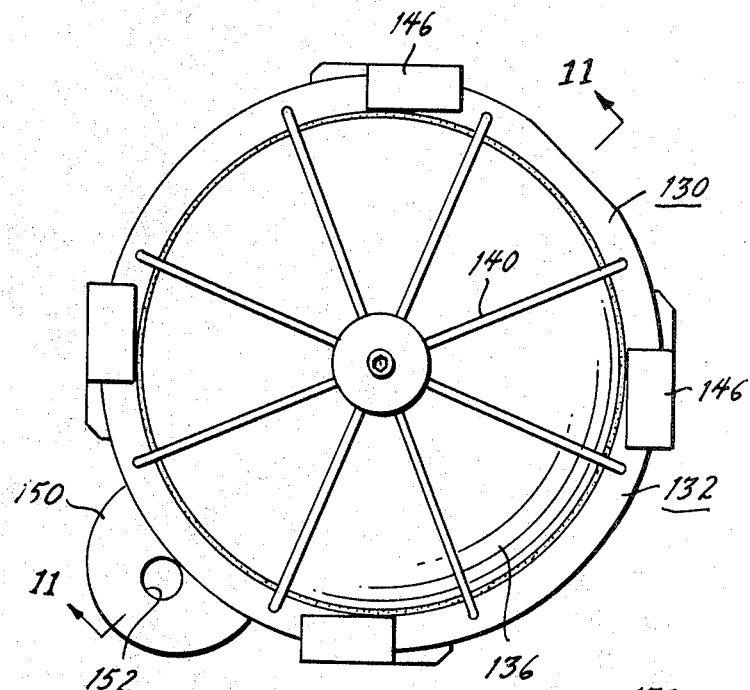
Figure 11:
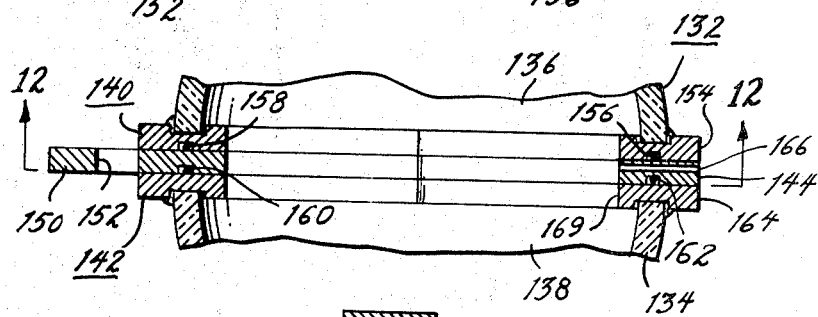
Figure 12:
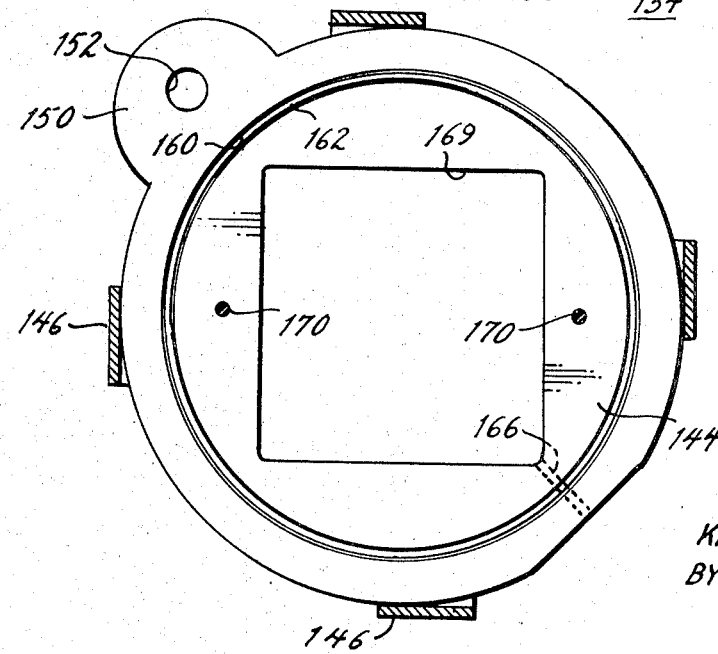

FIG. 1 is a top view of the instrument housing;
FIG. 2 is a front view of the instrument housing illustrated in FIG. 1;
FIG. 3 is a partial, sectional view taken along the line 3—3 in FIG. 2;
FIG. 4 is a view taken along the line 4—4 in FIG. 3, but cutting away one of the plates for purposes of illustration;
FIGS. 5 and 6 are partial, enlarged, sectional views taken along the lines 5—5 and 6—6, respectively, in FIG. 4;
FIG. 7 is a partial, enlarged, sectional view taken along the line 7—7 in FIG. 1;
FIG. 8 is a partial, enlarged, view, looking up at one of the retaining clamps, taken along the line 8—8 in FIG. 2;
FIG. 9 is a partial, enlarged, perspective view illustrating one of the clamps partially moved away from the plates.
FIG. 10 is a top view of a modified instrument housing;
FIG. 11 is a partial, sectional view taken along the line 11—11 in FIG. 10; and
FIG. 12 is a view taken along the line 12—12 in FIG. 11.

DESCRIPTION OF THE PREFERRED EMBODIMENTS

Referring to the drawings, FIGS. 1 and 2 illustrate a top and front view of a spherical-like, instrument housing 10 for oceanographic use comprising two hemisphere-like assemblies 12 and 14. The assemblies 12 and 14 include glass hemispheres 16 and 18, one for each of the assemblies, the glass hemispheres being protected by hemisphere-like cages 20 and 22.

The cage 20, the upper cage as viewed in FIGS. 1 and 2, comprises an equator-like plate 24 to which are secured longitude-like rods 26 which are peripherally spaced about the plate 24 and radially spaced from the outer surface of the glass hemisphere. The rods 26 extend upwardly, in an arc, from a peripheral plate portion 29, which projects radially beyond the outer surface of the glass hemisphere 16, to a retainer 30 which is centrally located at the top of the hemisphere 16, directly above what may be thought of as the north pole of the housing 10.

The cage 22 similarly includes a plate 34 to which are secured similar rods 36. The rods 36 are peripherally spaced about the plate 34 and extend downwardly from a peripheral plate portion 39, which projects radially beyond the outer surface of the glass hemisphere 18, toward a retainer 40 which is centrally located directly below what may be thought of as the south pole of the housing.

Preferably the rods 26 and 36 are formed of stainless steel material, and the central plates 24 and 34 are preferably aluminum plates, but it will be understood that other materials may be substituted for them.

The two plates 24 and 34 are provided with circular grooves 50 and 52 having flat surfaces 54 and 56 against which abut the flat terminal surfaces of the two glass hemispheres, as shown in FIGS. 3, 5 and 7. When the housing 10 is submerged in the ocean, the pressure of the water biases the glass hemispheres 16 and 18 toward each other, firmly seating them in the grooves 50 and 52. At the same time, of course, the flat opposed surfaces of the two plates 24 and 34 are biased toward each other by the water pressure.

As the material of the hemispheres 14 and 16 and of the plates 24 and 34 have different rates of expansion and contraction, it is preferred that the top and bottom surfaces of the grooves and the terminal surfaces of the glass hemispheres be suitably lubricated, for example, with a silicone grease.

So as not to restrict such relative movement, the grooves 50 and 52 are made wider than the thickness of the glass hemispheres 16 and 18, as shown. The lubricant also helps to seal the jointure between the abutting flat, terminal surfaces of the glass hemispheres 16 and 18 and the cooperating flat surfaces of the grooves 50 and 52. To prevent leakage of water into the housing, while the housing is at shallow depths, or for use in shallow depths, a suitable flexible, circular bead 58 of caulking, is placed in the "right" angle formed by the outer surface of the glass hemispheres and the surface of the plates, some of the caulking entering the grooves 50 and 52.

Also, one of the plates, plate 24, is provided with a circular groove 59 in the surface 53 which receives an O ring 57 of suitable material which seats in the groove 59 and bears on the opposed surface of 55 of the plate 34 to seal the jointure formed by the opposed surfaces 53 and 55 of the plates 24 and 34. While the opposed surfaces 53 and 55 are shown as mating, flat and horizontal it is seen that they could have other shapes.

Further, while in the drawings, the surfaces 53 and 55 are shown in abutment, there will in practice be a slight space between them because the thickness of the compressed O ring 57 is greater than the depth of the groove 59 to enable the O ring to perform its sealing function.

The retainers 30 and 40 are similar and FIG. 7 shows only the retainer 30, at an enlarged scale for illustrative purposes. The retainer 30 includes a crown 60, preferably of stainless steel, which is provided with spaced, threaded holes around its outer cylindrical surface which receive the threaded ends of the rods 26. The rods 26 may thereafter be brazed to the crown 60 to secure them in place.

Extending centrally through a threaded hole in the crown 60, as illustrated, is a threaded stud 62 seated in a suitable hole in a bearing plate 64, the bearing plate 64 being loosely secured to the stud 62 by a screw 66 countersunk in the lower surface of the bearing plate 64, as illustrated. Interposed between the bearing plate 64 and the glass hemisphere is a pad 70 of suitably soft rubber, or plastic material, so that the pad 70 tends generally to conform to outer spherical surface of the glass hemisphere. If desired, the pad 70 may be secured to the glass hemisphere by a suitable adhesive.

The function of the retainers 30 and 40 is to initially maintain the glass hemispheres seated in the grooves 50 and 52 by sufficiently threading the studs 62 toward the glass hemispheres so as to press the plate 64 against the pad 70. When the housing is in use at great ocean depths, the pressure of the water on the hemispheres will seat them firmly in the grooves, as previously mentioned.

As best shown in FIG. 5, the rods 26 and 36 have end portions 72 formed with threaded holes and are received in holes 74 formed in the marginal plate portions 29 and 39, the holes 74 being countersunk at both ends as shown. The holes 74 are radially spaced from the outer surface of the glass hemispheres 16 and 18, and circumferentially spaced from each other, as shown in FIG. 1, and the end portions of the rods 26 are secured to the plates by screws 76 (FIG. 5) whose heads are countersunk in the plates, so as to be slightly below the plate surface, the screws 76 being received in the threaded holes formed in the end portions 72 of the rods, as shown.

Spaced about the marginal plate portions 29 and 39 are clamps 82 carried by the portion 39. The clamps 82 are of a general U-shape, see FIGS. 3 and 9, and each clamp is pivoted about a projecting leg 83 about a bushing 84 which extends with a slip fit through the leg 83 and is secured to the marginal plate portion 39 by a stud 86. Preferably the bushing 84 has a collar 91 to provide a bearing surface for the leg 83, the head of the stud 86 resting against this collar so as to retain the bushing. Each clamp has a U-shaped notch 87 with a counterbore 88 to receive the head of a screw 89 to lock the clamp in its closed position, the screw 89 being threaded to, and carried by, portion 39. As best shown in FIG. 8, the base wall 81 of the clamps 82 is separated by a slight space from the outer cylindrical surfaces of the plates 24 and 34, even though such space is not fully shown in FIGS. 3 and 4. Further, the clamps 82, when closed or open, are slightly spaced from the caulking 58, as shown.

Each clamp 82 has a beveled surface 92 to facilitate closing of the clamp.

Thus, when the clamps 82 are in the closed and locked positions, FIGS. 1 and 2, for example, the opposed flat surfaces 93 and 94 of the clamps, bear against the outer flat surfaces 95 and 96 of the marginal plate portions 29 and 39 and press them toward each other, causing the O ring 57 to be compressed between the flat plate surface 55 and the bottom of the groove 59, to seal the jointure between the plates 24 and 34 and to prevent lateral motion of one cage relative to the other cage.

The plate 24 has a peripheral portion 100 milled flat and a hole 102 is drilled at this portion through the plate 34, so as to provide passage between the interior and exterior of the housing for electrical conductors, or the like, not illustrated. Preferably the hole 102 is threaded and an electrical connector is placed therein, so that the proper electrical connections may be made inside and outside of the housing, the electrical connector also sealing the hole against water leakage.

As shown in FIGS. 3 and 4, if desired, the plates 24 and 34 may be provided with openings 110 to accommodate suitable instruments. The portions 25 and 35 of the plates 24 and 34, respectively, within the housing provide platforms to which the instruments, not illustrated, may be secured, if desired, so as to avoid attaching the instruments to the glass hemispheres.

To expedite assembly of the housing, pins 120 are pressed in suitable holes in one of the plates and are received in slightly larger holes in the other plate, so as to properly align the two cages relative to each other.

While a specific number of rods 26 and 36 and of clamps 82 have been illustrated, it will be seen that more or less than the number illustrated may be used.

Referring to FIGS. 10, 11 and 12, a modification of the invention is illustrated comprising a housing 130 formed by two hemisphere-like assemblies 132 and 134 comprising a glass hemispheres 136 and 138 and a hemisphere-like protective cage 140 and 142.

The two hemisphere-like assemblies 132 and 134 will not be described hereinafter in detail as they are constructed similar to the corresponding parts described in connection with FIGS. 1 to 9.

Between the hemisphere-like assemblies 132 and 134 is placed a central, equator-like plate 144. The central plate 144 is held in place by clamps 146, similar to the clamps 82 described previously, but which are made to accommodate the additional thickness of the central plate.

The central plate 144 has an anchor 150 projecting radially outwardly with a suitable hole 152 therethrough, so that a suitable cable, or the like, may be attached to the housing at the anchor 150. If desired, more than one anchor may be provided spaced about the plate 144.

Sealing between the plate 154 (of cage 140) and the central plate 144 is provided by an O ring 156 and groove 158, and a similar groove 160 and O ring 162 is provided in the central plate 144 to seal the jointure between the lower surface thereof and the upper surface of the plate 164 (of cage 142).

One or more access holes 166, providing a passage between the interior of the housing and the exterior, are formed in the central plate 144. Such holes may or may not be placed in the plates 154 and 164 of the cages, as desired.

The central plate 144 may extend inwardly with the same configuration as the plates 154 and 164, i.e., it may be provided with a hole 169, as shown, or it may have a different configuration, as required, to provide a platform to which instruments may be mounted.

Alignment pins 170 may be pressed in either the plate 154 or 164, and the other plate, as well as the central plate 144 are provided with slightly larger holes to receive the pins.

Preferably the central plate 144 has a circular outer shape conforming to the shape of the plates 154 and 164, but for the anchor 150.

Also, the housing can be divided into two compartments, one separate from the other, if, for instance, the holes 169 are omitted from the plates 154 and 164.

Preferably the clamps are formed of aluminum, although other materials may be used. It is advantageous to use a material other than glass, however, for the plates, to facilitate forming the access holes in the plates, aluminum being preferred.

Thus, it is seen that the clamps provide quick release latches for easy and rapid opening and closing of the housing for access to the interior of the housing to change batteries, charts, or to service the instruments.

When the hemisphere-like assemblies are separated one from the other, the glass hemispheres remain within the protective cages, thus the edges of the precision ground, flat terminal surfaces of the glass hemispheres are not exposed, hence, accidental chipping is minimized or eliminated.

While the hemispheres have been described as being of glass it will be seen that other materials may also be used depending on the pressure and other conditions of use to which the housing is exposed. The hemispheres may be made of fibreglass, plastics or ceramics. If fibreglass is used a filament wound construction is preferred. If ceramics are used alumina ceramics and pyroceram are examples of suitable ceramics.

Having described this invention, what is claimed is:

1. A housing for oceanographic use comprising, two subassemblies and means for coupling said subassemblies to each other to form a closed housing, each subassembly comprising an annular wall, a hemisphere-like container having an end surface mounted on said wall, and protective means adjacent to and spaced from said hemisphere-like containers.

2. The combination recited in claim 1 wherein at least one of the annular walls is a plate extending within said hemisphere to support suitable instruments.

3. The combination recited in claim 1 wherein said means for coupling said subassemblies to each other comprises latch means for releasably securing said walls to each other.

4. The combination recited in claim 3 wherein said latch means comprises a clamp pivotally connected to one of the walls and lockable in the closed position.

5. The combination recited in claim 1 wherein said protective means comprises a hemisphere-like cage, said wall is made of metal and said container is made of glass.

6. The combination recited in claim 5 wherein said cage is attached to its associated wall.

7. The structure recited in claim 6 wherein each cage includes longitudinally-extending rods secured to its associated annular wall and enclosing its container.

8. The combination recited in claim 5 and further including biasing means carried by said protective means for urging said container into contact with its associated wall.

9. The combination recited in claim 5 wherein said wall includes a hole extending from the inside of the housing to the outside thereof.

10. A housing for oceanographic use comprising, two subassemblies and means for coupling said subassemblies to each other, each subassembly comprising an annular wall, protective means carried by said wall, a hemisphere-like container, and biasing means carried by said protective means for urging an end wall of said container into abutment with said wall.

References Cited

UNITED STATES PATENTS

| | | | |
|---|---|---|---|
| 2,952,378 | 9/1960 | Renslow | 220—5(A) |
| 3,224,620 | 12/1965 | Orr | 220—5(A) |
| 3,243,496 | 3/1966 | Silverstein | 73—431X |
| 3,248,939 | 5/1966 | Silverstein | 73—170(O) |
| 3,277,724 | 10/1966 | Lundeberg | 73—170X |
| 3,283,348 | 11/1966 | Farmer et al. | 220—5(AX) |
| 3,305,121 | 2/1967 | Horn et al. | 220—5(A) |
| 3,329,297 | 2/1967 | Jordan | 114—116X |
| 3,351,035 | 11/1967 | McLean | 114—16 |

LOUIS R. PRINCE, Primary Examiner

D. M. YASICH, Assistant Examiner

U.S. Cl. X.R.

73—300; 114—16